(12) United States Patent  
Kamarthy et al.

(10) Patent No.: US 8,266,286 B2  
(45) Date of Patent: Sep. 11, 2012

(54) DYNAMIC KEY MANAGEMENT SERVER DISCOVERY

(75) Inventors: Kavitha Kamarthy, Milpitas, CA (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 834 days.

(21) Appl. No.: 11/758,091

(22) Filed: Jun. 5, 2007

(65) Prior Publication Data

US 2008/0307054 A1   Dec. 11, 2008

(51) Int. Cl.  
*G06F 15/16* (2006.01)

(52) U.S. Cl. ........ 709/226; 709/206; 709/221; 709/223; 713/170; 713/171; 380/277

(58) Field of Classification Search ................... 380/277; 709/223, 206, 221; 713/170, 171  
See application file for complete search history.

(56) References Cited

U.S. PATENT DOCUMENTS

| | | | | |
|---|---|---|---|---|
| 2002/0147771 | A1* | 10/2002 | Traversat et al. | 709/203 |
| 2006/0184797 | A1* | 8/2006 | Weis et al. | 713/178 |
| 2006/0200670 | A1 | 9/2006 | Kuffel | 713/170 |
| 2007/0016663 | A1 | 1/2007 | Weis | 709/223 |
| 2007/0195760 | A1* | 8/2007 | Rahman et al. | 370/389 |
| 2007/0198836 | A1 | 8/2007 | Fedyk | 713/171 |

OTHER PUBLICATIONS

RFC4046(2005). Multicast Security (MSEC) Group Key Management Architecture. Retreived Jun. 14, 2010 from http://www.faqs.org/rfcs/rfc4046.html.*

Cisco (Feb. 2006). Cisco Extends Integrated Security and IP Voice Quality with Cisco IOS Software Release 12.4(6)T. retrieved from http://www.cisco.com/en/US/prod/collateral/iosswrel/ps8802/ps6968/ps6441/ps6824/prod_presentation0900aecd8041bb41.pdf.*

* cited by examiner

*Primary Examiner* — Haresh N Patel  
*Assistant Examiner* — Brian Shaw  
(74) *Attorney, Agent, or Firm* — Campbell Stephenson LLP

(57) ABSTRACT

Various systems and method are disclosed for automatically disseminating key server contact information in a network. For example, one method (e.g., performed by a discovery server) involves generating a discovery message that includes at least one list of one or more key servers and then sending that discovery message to one or more members of a key management protocol group. Each list of key servers can include contact information for one or more key servers and indicate the priority of each key server relative to other key servers within the list.

19 Claims, 6 Drawing Sheets

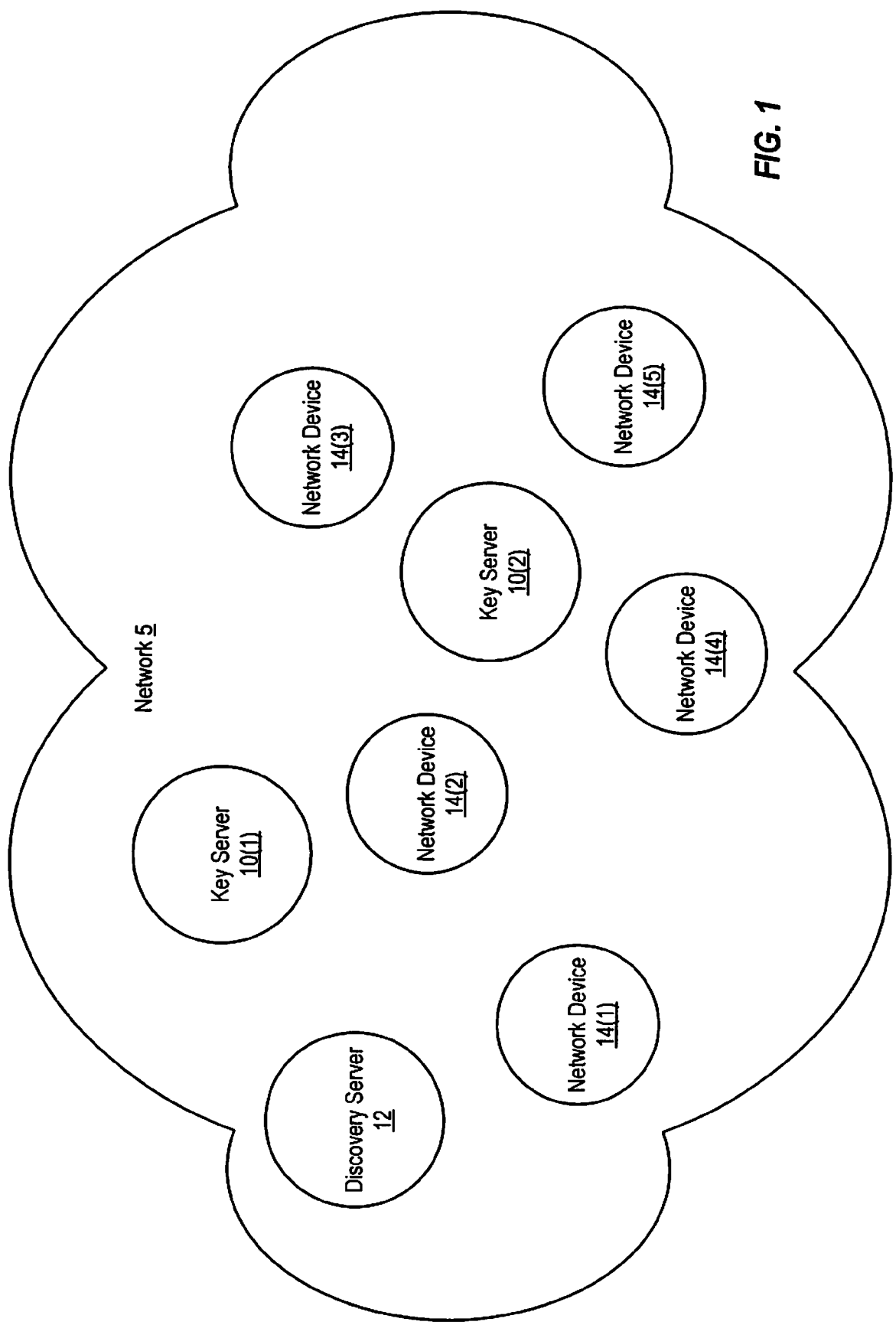

| Source Address 210 | Multicast Destination Address 215 |
|---|---|
| List of Key Servers 220(1) ||
| List of Key Servers 220(2) ||
| List of Key Servers 220(3) ||
| Sequence Number 225 ||
| Signature 230 ||

*FIG. 2A*

| Source Address 210 | Multicast Destination Address 255 |
|---|---|
| List of Key Servers 250 ||
| Sequence Number 225 ||

*FIG. 2B*

| Signature 230 | X.509 Identity Certificate 232 |
|---|---|

*FIG. 2C*

DYNAMIC KEY MANAGEMENT SERVER DISCOVERY

FIELD OF THE INVENTION

This invention relates to networking and, more particularly, to key management systems within a network.

BACKGROUND

Key management servers, such as Group Domain of Interpretation (GDOI) servers, distribute cryptographic policy and encryption keys to one or more group members. The policy and keys are used to implement a security feature, such as security for broadcast or multicast traffic. For example, the policy and keys distributed by GDOI servers can be used to exchange encrypted data using IP Security (IPSec) data encryption.

When the number of group members is large (e.g., in the hundreds or thousands), it is often advantageous to deploy multiple key management servers. Each key management server can serve a subset of the group members. The key management servers can cooperate with each other, such that all key management servers within the same key management system will distribute the same policy and keys.

To provide redundancy within a system that includes multiple key management servers, group members can be configured with contact information for more than one key management server. For example, group members can be configured with an ordered list of key management servers. This ordered list identifies the primary key management server (e.g., the first key management server that a group member should attempt to contact when the group member needs keys), as well as one or more backup key management servers (e.g., servers that the group member should attempt to contact if the primary key server is unavailable). Such a technique allows a key server administrator to assign subsets of the group members to different sets of key servers. Different sets of key management servers can also be assigned to different subsets of the group members to provide load balancing among the key management servers.

Currently, the ordered list of key management servers is manually preconfigured on each group member. This presents an additional burden for key server administrators, since an administrator must manually enter the list of key management servers on each group member. Additionally, if key management servers are added or retired, at least some of the lists of key management servers may need to be updated. This again requires an administrator to manually configure information on one or more group members. As this example shows, improved techniques for configuring each group member with a list of key management servers are desirable.

BRIEF DESCRIPTION OF THE DRAWINGS

A more complete understanding of the present invention may be acquired by referring to the following description and the accompanying drawings, in which like reference numbers indicate like features.

FIG. 1 is a block diagram of a key management system, according to one embodiment of the present invention.

FIG. 2A shows an example of a discovery message, according to one embodiment of the present invention.

FIG. 2B shows another example of a discovery message, according to another embodiment of the present invention.

FIG. 2C shows an example of a signature within a discovery message, according to one embodiment of the present invention.

Figure 3:
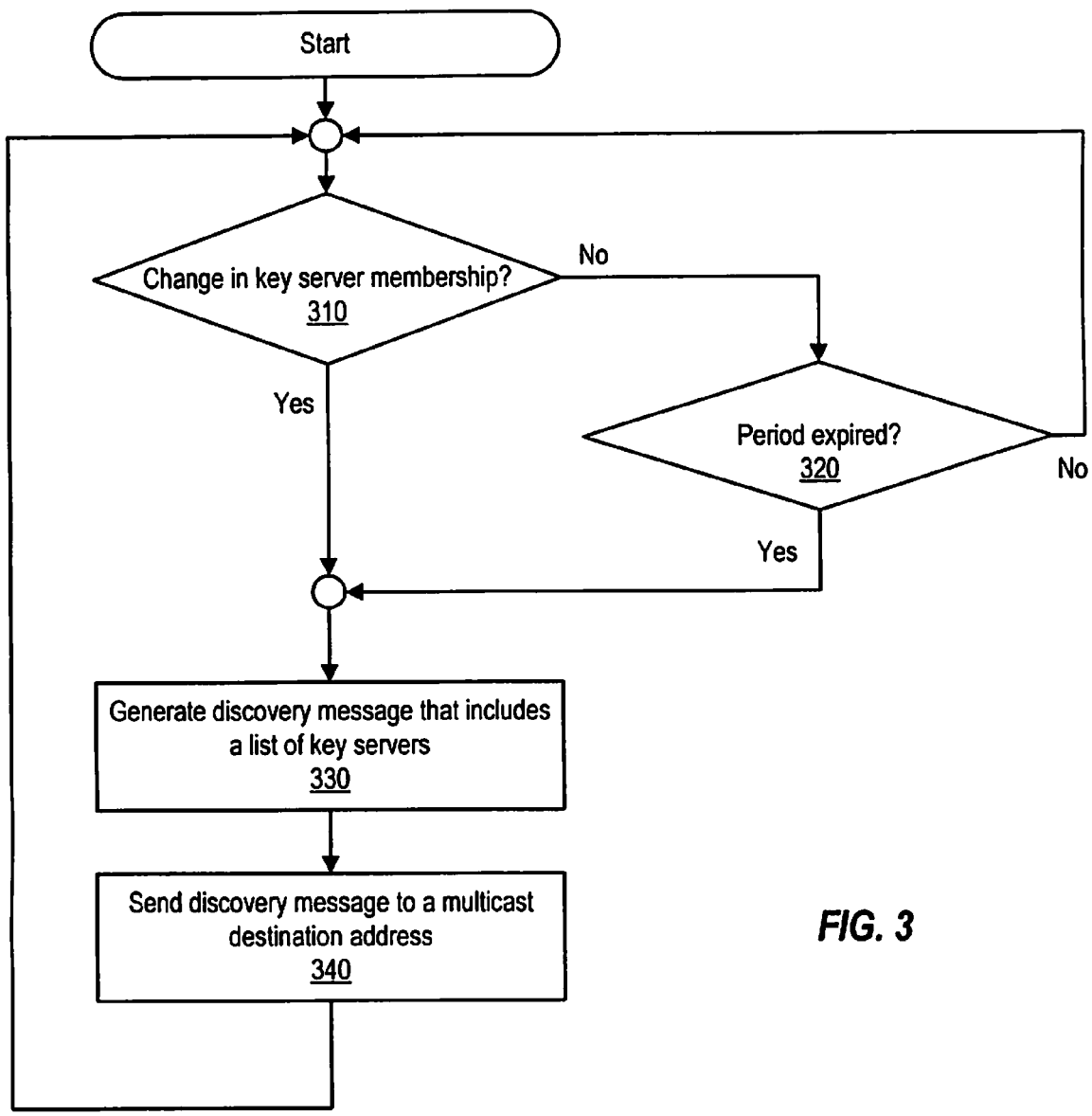
FIG. 3 is a flowchart of a method performed by a discovery server, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Group members dynamically obtain an ordered list of one or more key servers (also referred to herein as a key server list) from one or more discovery servers. Whenever a change in key server membership is detected, a discovery server can provide a new ordered list of key servers, which reflects the membership change, to affected group members. The group members can then use the received list of key servers to contact the appropriate key servers. Accordingly, manual configuration of the key server list on the group members is not necessary.

The discovery server sends the ordered list of key servers to group members within a discovery message. The discovery message can be sent to a known multicast address associated with group members. The discovery message can also include a signature or other security feature that a group member can use for authentication and/or authorization.

In some embodiments, different group members are provided with different ordered lists (e.g., in order to load balance among the key servers). The discovery message sent to a group can contain multiple ordered lists (one list for each of several subgroups within the group). Alternatively, the discovery server can send several different discovery messages, each containing a different one of several ordered lists. Each different discovery message is sent to a respective subgroup within the group.

FIG. 1 is a block diagram of a network 5. As shown, network 5 includes two key management servers (referred to as "key servers" herein) 10(1)-10(2), as well as five network devices 14(1)-14(5), which are group members of the same key management group (as such, network devices 14(1)-15(5) are also referred to herein as "group members 14(1)-15(5)"). Network 5 also includes a discovery server 12. It is noted that other embodiments can include different numbers and arrangements of network devices and security servers than are shown in this example. For example, an alternative embodiment can include multiple discovery servers and/or significantly more group members than are shown in the illustrated example.

Key servers 10(1)-10(2), discovery server 12, and network devices 14(1)-14(5) can be interconnected by logical and/or physical links. For example, in one embodiment, network device 14(2) can be coupled to key server 10(1) by a physical Ethernet link, while network device 14(1) is coupled to network device 14(2) by a logical tunnel.

Network devices 14(1)-14(5) can each be one of various types of network devices, including routers, bridges, gateways, switches, and the like. Some network devices can also be end devices, host devices, or client devices (e.g., such as personal computers). Some network devices can also be configured to operate as key servers and/or discovery servers. It is noted that the same device (e.g., the same network device) can be configured as both a key server and a discovery server, or as both a discovery server and a group member. Alternatively, the key servers, discovery servers, and group members can be configured on different devices, as shown in FIG. 1.

In general, a key server, such as key servers 10(1) and 10(2), is a network component that provides other network components with cryptographic policy ("policy") and/or encryption keys ("keys"). In some embodiments, the key servers are Group Domain of Interpretation (GDOI) servers. Alternatively, key servers can implement other key management protocols, such as Group Domain of Interpretation version two (GDOIv2).

Group members, such as network devices 14(1)-14(5), obtain policy and keys from key servers 10(1) and 10(2) by registering with one of key servers 10(1) and 10(2). When a group member attempts to register with a key server, the key server first authenticates and authorizes the group member. If the group member is successfully authenticated and authorized, the key server will complete the registration process by sending the group member the appropriate keys and policy. Once a group member has received keys and policy from a key server, the group member will use the keys to encrypt and decrypt communications and the policy to create security associations. Group members that receive the same policy and keys can communicate together as a group.

When multiple key servers operate at the same time for the same group, as in the example shown in FIG. 1, those key servers will cooperate with each other in order to distribute the same policy and keys. Thus, regardless of which key server a group member contacts, that group member will receive the appropriate keys and policy for the group. For example, multiple GDOI servers for a particular group can provide common IPsec keys to a group of Virtual Private Network (VPN) gateways (these gateways are the group members in this example), allowing all of the VPN gateways to encrypt and decrypt the same IP multicast packets.

Discovery server 12 is configured to distribute one or more lists of key servers to group members 14(1)-14(5). Each key server list identifies one or more key servers. The network addresses and/or ports used to communicate with the key servers can be used to identify the key servers.

When a group member receives a discovery message, the group member can extract one or more key server lists from the discovery message. The extracted list(s) can be stored locally. The group member can access the stored list in order to obtain the information (e.g., such as a network address and/or port) needed to contact a key server and/or information identifying which of several key servers to contact first. When multiple key servers are included in a key server list provided to a group member, that group member will have the information needed to contact a different key server if a situation arises in which the first key server on the list is non-responsive when the group member attempts to register.

As indicated above, discovery server 12 can distribute more than one key server list at a time. Each key server list can identify different key servers and/or different key server priorities. The key server priority, which is used by a group member to select the order in which the key servers should be contacted, can be indicated by listing the key servers in order of priority and/or by providing additional priority information for each key server in the list.

By providing multiple key server lists, discovery server 12 can control which group members will attempt to register with any given key server. This can be used for purposes such as load balancing access to the key servers. As an example, in the network of FIG. 1, two key server lists, which indicate priority by listing the key servers in priority order, can be generated. The first key server list can identify key server 10(1) and then key server 10(2). The second key server list can identify key server 10(2) and then key server 10(1). The first key server list can be provided to group members 14(1) and 14(2), and the second key server list can be provided to group members 14(3), 14(4), and 14(5). Based upon the lists received, group members 14(1) and 14(2) will initially attempt to register with key server 10(1), while group members 14(3), 14(4), and 14(5) will initially attempt to register with key server 10(2). Accordingly, even if all five group members attempt to register at the same time, each key server 10(1) and 10(2) will only receive two or three registration requests (as opposed to all five registration requests being directed to a single key server).

If one of the key servers is unresponsive, the group members that were attempting to register with that key server can attempt to contact the next key server on their key server list. Thus, if group member 14(1) detects that key server 10(1) is unresponsive, group member 14(1) can attempt to register with key server 10(2).

Discovery server 12 can distribute key server lists in discovery messages. Discovery server 12 encapsulates one or more lists of key servers into a discovery message, which is then sent to the group members. For example, discovery server 12 can generate an ordered list of key servers that identifies key server 10(1) first and key server 10(2) second, encapsulate that list in a discovery message, and send the message to one or more group members.

A discovery server can distribute discovery messages to group members in a variety of different ways. In one embodiment, a discovery server sends an identical discovery message to all group members. In such an embodiment, the discovery message can be sent to a multicast address, and all of the group members are members of the multicast group identified by that multicast address. In this situation, a single discovery message can include multiple different key server lists, which are then provided to group members within different subgroups, as described in more detail below.

In an alternative embodiment, the group members within a particular key management protocol group are divided into subgroups. While all group members (regardless of the subgroup to which they are assigned) will receive the same keys and policy, group members in different subgroups will receive different discovery messages, which can each contain different key server lists. Group members within different subgroups can be assigned to different multicast groups, and the different discovery messages can be sent to different multicast group addresses as appropriate. The key server lists contained in different discovery messages can identify different priorities and/or key servers. For example, the key server lists in different discovery messages can identify the same key servers in different orders, or the key server lists can identify different groups of key servers.

As an example, in the network of FIG. 1, group members 14(1) and 14(2) can be assigned to a first subgroup and group members 14(3), 14(4), and 14(5) can be assigned to a second subgroup. Group members 14(1)-14(2) will join a first multicast group having multicast address M1 and group members

14(3)-14(5) will join a second multicast group having multicast address M2. Discovery server 12 can encapsulate a first list (key server 10(1), key server 10(2)) in a first discovery message and send that first discovery message to multicast address M1. Discovery server 12 can also encapsulate a second list (key server 10(2), key server 10(1)) in a second discovery message and send that second discovery message to multicast address M2.

Thus, in either embodiment, discovery server 12 can be configured to generate a discovery message and to send that discovery message to a multicast group (e.g., as identified by a well-known, site-specific Internet Protocol (IP) multicast address). Each group member can be configured as a member of a multicast group and will thus be configured to receive any discovery message sent to that multicast group. A multicast group can be a group that includes the entire set of group members, or a group that includes a particular subset of group members.

It is noted that some embodiments can include multiple discovery servers. In such embodiments, the discovery servers can be configured to cooperate with each other in order to maintain the same key server lists for each group and/or subgroup. For example, the discovery servers can implement periodic or routine (e.g., in response to predetermined stimuli) messaging and/or use consensus techniques to ensure that each discovery server will distribute the same key server lists.

In the above example, discovery server 12 provides key server lists for a single key management protocol group (which may include multiple subgroups). In alternative embodiments, a single discovery server can provide key server lists for multiple key management protocol groups.

Discovery server 12 can include a user interface via which a user can manually provide key server contact information to the discovery server, allowing the discovery server to then include that information in a discovery message. For example, discovery server 12 can include a command line interface (CLI) that allows a network administrator to enter contact information (e.g., a network address and port identifier) for each of one or more key servers. Discovery server 12 can also allow a user to enter the priority assigned to each key server for a given subgroup or to otherwise control how the key server lists for different subgroups will be generated. For example, in one embodiment, discovery server 12 allows a user to enter the specific key server list, in priority order, for each subgroup with a given key management protocol group.

In some embodiments, discovery server 12 will generate a key server list by simply regenerating a prespecified list, exactly as that list was provided by a user. In other embodiments, discovery server 12 can be configured to generate a key server list from information provided by a user using a prespecified algorithm. For example, a user can provide discovery server 12 with a list of each key server and its contact information, along with other relevant information (e.g., the physical location of each key server, the maximum number of group members supported by each key server, the number of group members to be assigned to each key server, etc.). Based upon this information, discovery server 12 can dynamically generate a key server list for a given group or subgroup. For example, discovery server 12 can be configured to generate a list for a particular subgroup that prioritizes key servers that are physical closer to most of the subgroup members above key servers that are more remote from the majority of the subgroup members.

When the discovery server detects that key server contact information has changed, at least some of the group members may need to be provided with new key server contact information. For example, if a new key server is added to network 5, or if an existing key server is removed from service (e.g., due to a failure or for routine maintenance), at least some group members may be affected. Similarly, if the network contact information for a particular key server is changed, some group members may be unable to contact that key server using the previously-received contact information. Accordingly, discovery server 12 can be configured to resend one or more discovery messages to some or all group members whenever key server contact information changes. It is noted that the initial receipt of information identifying key servers (e.g., when discovery server 12 is initially powered on and configured for operation) can also be a situation in which discovery server 12 detects that key server contact information has changed.

If discovery server 12 sends discovery messages periodically, each network device will receive the latest key server lists, without any manual intervention, at the end of each period. Alternatively, discovery server 12 can send the updated key server lists to affected group members as soon as a modification to the key server contact information is detected instead of waiting for the period to end. In some embodiments, discovery server 12 can be configured to detect at least some changes automatically (e.g., by periodically exchanging messages with key servers in order to detect a failed or removed key server) and to update key server lists in response to detecting such changes. In other embodiments, all key server contact information changes are manually provided to discovery server 12 by a user.

Whenever a group member receives a new discovery message, the group member will compare the list of key servers extracted from the new discovery message to the group member's existing list of key servers. If the lists do not match, the group member will overwrite its existing list with the list extracted from the new discovery message (if the group member was preconfigured with the identity of any key server, this preconfigured information may not be overwritten, at least in some embodiments).

In some embodiments, any time that a group member updates its key server list, the group member will reregister with the key server identified as having the highest priority within the updated key server list. In alternative embodiments, the group member will selectively reregister. For example, if the updated key server list identifies a different key server as having the highest priority than the pre-update version of the key server list identified, the group member will register; otherwise, the group member will not reregister. As another example, if the difference between the lists involves only the priority of the listed key servers, the group member can select to reregister with the new highest priority key server (however, such reregistration is not needed). If instead the difference between the lists indicates that the previous highest priority key server has been removed, the group member will reregister with the new highest priority key server.

The above description has focused on scenarios in which the discovery server initiates the sending of discovery messages. It is noted that in alternative embodiments, the group members can themselves initiate this process. For example, group members can be configured to routinely (e.g., at predefined intervals, in response to particular stimuli such as detection of one or more non-responsive key servers, and/or at startup) request a discovery message from discovery server 12. In these embodiments, discovery server 12 may send the discovery messages to unicast addresses (e.g., the address of the group member that requested the discovery message) instead of multicast addresses. If there are multiple subgroups within the key management protocol group, discovery server 12 can be configured with a table that identifies the particular key server list to be provided to each subgroup. When a request for a discovery message is received from a group member, discovery server 12 can lookup the appropriate list to provide to that group member, based upon which subgroup includes the group member (e.g., the discovery server can maintain a list of which group members belong to each subgroup or the group members can be configured to include a subgroup identifier in discovery message requests).

It is noted that the above-described techniques for disseminating key server lists using discovery server 12 do not preclude the use of the conventional methods (e.g., such as manual configuration of individual group members with key server contact information) of obtaining key server lists. Such techniques can be used in conjunction with the techniques described herein.

FIG. 2A is an illustration of a discovery message. In this example, the discovery message includes a source address 210, a multicast destination address 215, three lists of key servers 220(1), 220(2), and 220(3), a sequence number 225, and a signature 230. The discovery message shown in FIG. 2A can also include a value (not shown) that identifies the key management protocol group to which the discovery message is being sent. It is noted that in other embodiments, other information can be included within a discovery message instead of and/or in addition to the information shown in this example.

Source address 210 can identify the discovery server (e.g., discovery server 12 of FIG. 1) that generated the discovery message. Multicast destination address 215 identifies the multicast group that includes the group members to which the discovery message is being sent. In this example, the group members have been subdivided into multiple subgroups, and multicast destination address 215 identifies a multicast group that includes each of those subgroups.

The addresses (source address 210 and multicast destination address 215) can include various network addresses, such as Ethernet addresses, Internet Protocol addresses, and the like. The addresses can also include information identifying the ports (e.g., the User Datagram Protocol (UDP) port) via which the source and destination receive communications.

Each list of key servers 220(1)-220(3) identifies one or more key servers. If multiple key servers are identified in a particular list, that list can also indicate the relative priority of the identified key servers. The relative priority can be indicated by the order of the key servers (e.g., key servers with a higher priority can be listed first) and/or by explicit information (e.g., a numeric identifier identifying the relative or absolute priority of an associated key server).

Each different list can identify the same or different key servers. Typically, different lists will identify different priorities of the same key servers and/or different groups of key servers. For example, if there are three key servers A, B, and C, list 220(1) can identify key servers A and B (in that order), list 220(2) can identify key servers B and C (again, in that order), and list 220(3) can identify key servers C and A (in that order). Thus, in this example, each list identifies both a different set of key servers and different priorities of the same key servers within each list.

Each group member can be configured with a subgroup identifier that identifies the subgroup to which that group member belongs. For example, a network device can be assigned a subgroup identifier for use with the key management protocol (e.g., by inputting such an identifier to the network device via a CLI).

The subgroup identifier (not shown in FIG. 2) can be included in the discovery message, such that a subgroup identifier is associated with the list of key servers to be used by group members within that subgroup. When a group member receives the discovery message, the group member can scan the discovery message for the correct subgroup identifier. Once the subgroup identifier has been found, the group member can extract the list of key servers associated with that subgroup identifier and then save or otherwise use the extracted list.

Sequence number 225 is an optional value. In embodiments that implement sequence numbers, the discovery server maintains a sequence number (e.g., using a counter or clock). The discovery server can increment the sequence number each time a discovery message is sent. Alternatively, the sequence number can be implemented using a clock or running counter that generates a value that increases over time. Each time the discovery server sends a discovery message, the discovery server includes the current sequence number value.

A group member can store the sequence number from the last discovery message processed by that group member. When a subsequent discovery message is received, the group member can extract the sequence number from the discovery message and compare that extracted sequence number to the stored sequence number. If the extracted sequence number is greater than the stored sequence number (indicating that the subsequent discovery message was in fact generated at a later time than the discovery message most recently processed by the group member), the group member will process the subsequent discovery message. If the extracted sequence number is less than or equal to the stored sequence number, the group member will not process the subsequent discovery message, since the sequence number comparison indicates that the subsequent discovery message may include out-of-date information.

In some embodiments, the key server lists generated by the discovery server may need to be broken up into several discovery messages for transmission to the group members. In such an embodiment, sequence numbers can be used to reconstruct the proper sequence of discovery messages and thus recombine the key server lists encapsulated within the discovery messages in the proper order.

It is noted that some embodiments may not implement sequence numbers. In such embodiments, group members will process all received discovery messages.

Signature 230 contains the security signature of the discovery server that generated the discovery message. For example, signature 230 can include the public key signature of the discovery server. As shown in FIG. 2C, signature 230 can optionally include one or more X.509 identity certificates such as X.509 identity certificate 232. A group member that receives the discovery message can use signature 230 to authenticate and/or authorize the discovery message prior to processing the discovery message (if the signature fails the authentication and/or authorization process, the group member will not process the discovery message). The discovery server can create signature 230 by hashing the message bytes prior to the signature field, encrypting the hash with the discovery server's private key, and appending the encrypted hash as signature 230 in the discovery message.

In one embodiment, each group member performs two validations before determining that a discovery message is authentic and processing the discovery message. The group member first authenticates the discovery server by validating that the discovery message was properly signed by a trusted device. The group member then authorizes the discovery server by validating that the signing device was authorized to send the discovery message.

The group member can use signature 230 to perform both authentication and authorization. In particular, the group member can use the public key to authenticate the discovery message by hashing the message bytes prior to the signature field, decrypting the hash with the public key, and then verifying that the decrypted result matches the hash computed by the group member.

As noted above, signature 230 can include the public key signature of the discovery server. The two conventional techniques for obtaining a public key are to either pre-configure the public key or to obtain the public key from a digital certificate. Thus, in one embodiment, each group member can be preconfigured (e.g., by an administrator) with the public key of the discovery server, and this preconfigured public key can be used to validate the public key signature included in a discovery message. This preconfiguration technique simplifies the authentication process, because only the public key itself is needed to authenticate the discovery server. When preconfiguration is used, a successful authentication implies that the network device that sent the discovery message is authorized to be the discovery server, so successful authentication also provides authorization.

In alternative embodiments, digital certificates are used for authentication, instead of preconfiguring the public key of the discovery server on each of the group members. In these embodiments, signature 230 includes the digital certificate associated with the discovery server. The digital certificate associated with the discovery server includes the discovery server's public key.

In embodiments using digital certificates, each group member is preconfigured with the public key of the device that is acting as the certificate authority. The certificate authority generates digital certificates for the group. The certificate authority signs each digital certificate, and this signature can be authenticated using the certificate authority's public key.

In embodiments in which digital certificates are used, the discovery server will include its digital certificate in the discovery message. Upon receiving a discovery message, the group member will validate that the digital certificate was properly signed by the certificate authority, using the preconfigured public key of the certificate authority. Upon successful validation, the group member authenticates the discovery message by extracting the discovery server's public key from the digital certificate and uses the extracted public key to determine whether the discovery message was properly signed.

To allow authorization in this situation, the group administrator can embed information within the digital certificate indicating that the discovery server is authorized to act as a discovery server. For example, the group administrator can embed an attribute (e.g., a hostname) in the certificate SubjectID or AltSubjectID fields. The group members can extract the embedded attribute from the certificate and use the extracted attribute to authorize the discovery message. For example, the group members can extract an embedded hostname and validate that hostname against an access control list (ACL). Alternatively, instead of embedding an attribute, the authorization could be identified by defining a new object identifier (e.g., using the technique described in IETF RFC 3280, Section 4.2.1.3) or defining a private X.509 extension and using the defined object identifier or extension to store a value indicating that the discovery server is authorized. As yet another authorization alternative, the addresses of authorized discovery servers can be preconfigured on the group members (as opposed to indicating that the discovery server is authorized within the certificate).

FIG. 2B shows a different version of a discovery message. The discovery message shown in 2B is used when different discovery messages are sent to different subgroups of a key management protocol group. Here, each discovery message only includes the key server list associated with a particular subgroup (instead of including the key servers lists associated with all subgroups like the version shown in FIG. 2A). It is noted that the discovery message shown in FIG. 2B can also be used when all group members in a given group are sent the same key server list (i.e., when subgroups are not being implemented).

The discovery message of FIG. 2B includes source address 210, a multicast destination address 255, a list of key servers 250, sequence number 225, and signature 230. Several of these values (source address 210, sequence number 225, and signature 230) are the same as those shown in FIG. 2A and thus have been given the same reference number. Descriptions of these common values are provided above in the description of FIG. 2A. It is noted that in other embodiments, other information can be included within a discovery message instead of and/or in addition to the information shown in this example.

In FIG. 2B, multicast destination address 255 is the multicast address of the multicast group to which group members in a particular subgroup belong. Thus, discovery messages sent to different subgroups of the same key management protocol group will have different multicast destination addresses.

In embodiments that use different discovery messages for different subgroups, individual group members do not need to be configured with a subgroup identifier. Instead, each group member is configured to join the particular multicast group associated with the subgroup that includes that group member.

When group member receives the discovery message shown in FIG. 2B, the group member performs authentication and authorization and then, assuming the authentication and authorization is successful, the group member simply extracts the list of key servers 250, which is the only list in the discovery message, and stores or otherwise uses the extracted list.

FIG. 3 is a flowchart of a method performed by a discovery server (e.g., discovery server 12 of FIG. 1). In this example, the discovery server sends discovery messages periodically, as well as whenever a change in key server membership (or other change in key server contact information) is detected.

This method begins at 310, when the discovery server determines whether a change in key server membership has occurred. The discovery server can detect this change automatically (e.g., by detecting that a key server has failed) or in response to receiving input indicating such a change from an administrator. A change can be detected when key servers are added to a network (e.g., as detected automatically or in response to user input identifying new key servers), when key servers are removed from the network (e.g., as detected automatically or in response to user input removing key servers), when existing contact information for a key server is modified, when the discovery server initially begins operation (e.g., when the discovery server first receives information identifying the key servers present within the network), and in similar situations.

If a change has occurred, or if the current period for sending discovery messages has expired (as determined at 320), the discovery server generates a new discovery message that includes an appropriate list of key servers, as shown at 330. The new discovery message will only identify key servers that are currently present (e.g., if the change detected at 310 was the removal or failure of a key server, the new discovery message will not identify that removed or failed key server in any key server list). Thus, if the discovery message is being generated in response to a change, the list may include different key servers than previous versions of the list identified. The discovery server then sends the discovery message to a multicast destination address, as shown at 340.

It is noted that in some embodiments, performance of operation 330 may actually involve generating multiple key server lists for inclusion within a single discovery message. Alternatively, performance of operation 330 may involve generating multiple discovery messages, each containing a different key server list, and sending those discovery messages to different multicast destination addresses.

Since the example of FIG. 3 describes the behavior of a discovery server that is sending discovery messages periodically and/or in response to each change, the operations shown in FIG. 3 can be repeated one or more times.

Other embodiments can include additional operations instead of and/or in addition to those shown in FIG. 3, and that other embodiments may also eliminate or modify certain functions shown in FIG. 3. For example, it is noted that in alternative embodiments, discovery messages may only be sent when changes are detected, and thus operation 320 may be eliminated (in such embodiments, it may be desirable to send a given discovery message multiple times or to require some sort of acknowledgement from group members, since multicast communications may not be reliable). Similarly, in some embodiments, discovery messages may be sent in response to requests from group members, and thus an additional operation to detect such requests may be added (as noted above, discovery messages sent in response to such requests can be sent to unicast addresses).

Figure 4:
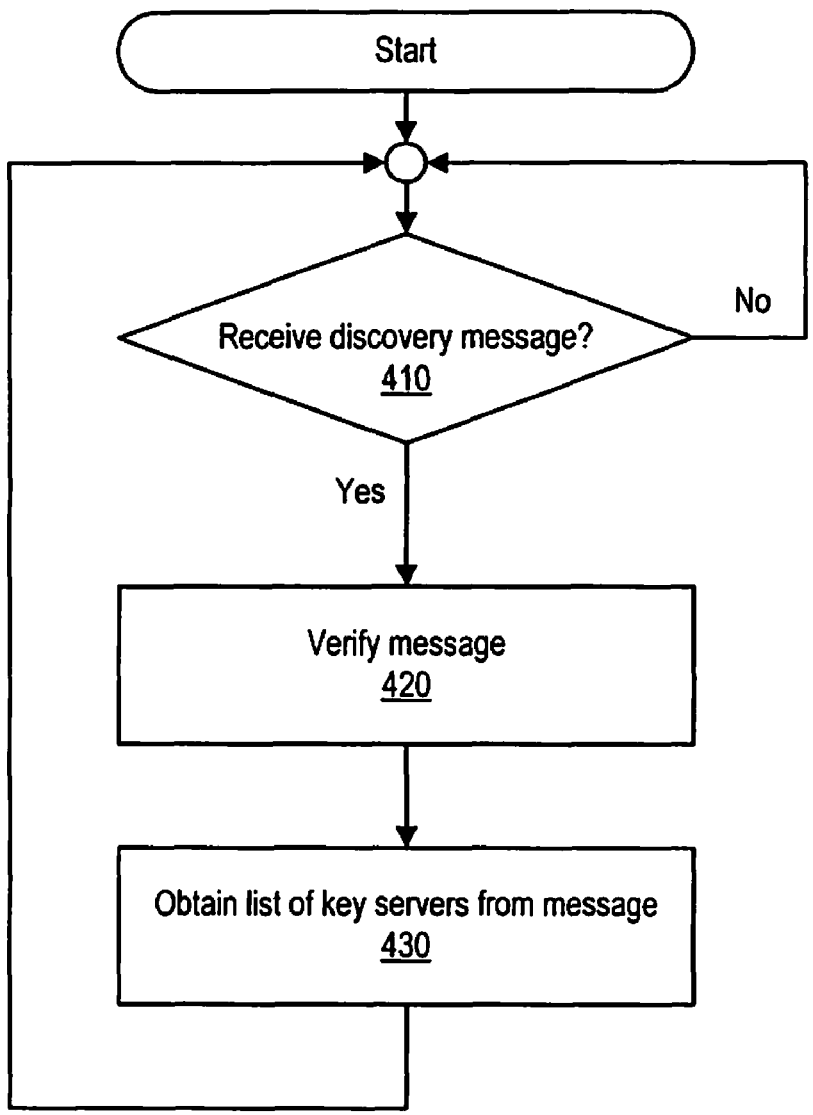
FIG. 4 is a flowchart of a method performed by a group member, according to one embodiment of the present invention.

FIG. 4 is a flowchart of a method performed by a group member (e.g., one of network devices 14(1)-14(5) of FIG. 1). The method begins at 410. If a discovery message has been received, the group member can verify that discovery message (e.g., by authenticating and/or authorizing the discovery message using one of the above-described techniques), as shown at 420.

The group member can then extract a list of key servers from the message, as shown at 430. If the discovery message includes multiple key server lists, performance of operation 430 can involve comparing the group member's subgroup identifier to subgroup identifiers associated with each of the multiple key server lists. The group member can then extract the key server list associated with the matching subgroup identifier.

It is noted that the method of FIG. 4 can include additional operations instead of and/or in addition to those described above. For example, the group member can additionally check a sequence number within the discovery message in order to determine whether to process the discovery message at all.

Figure 5:
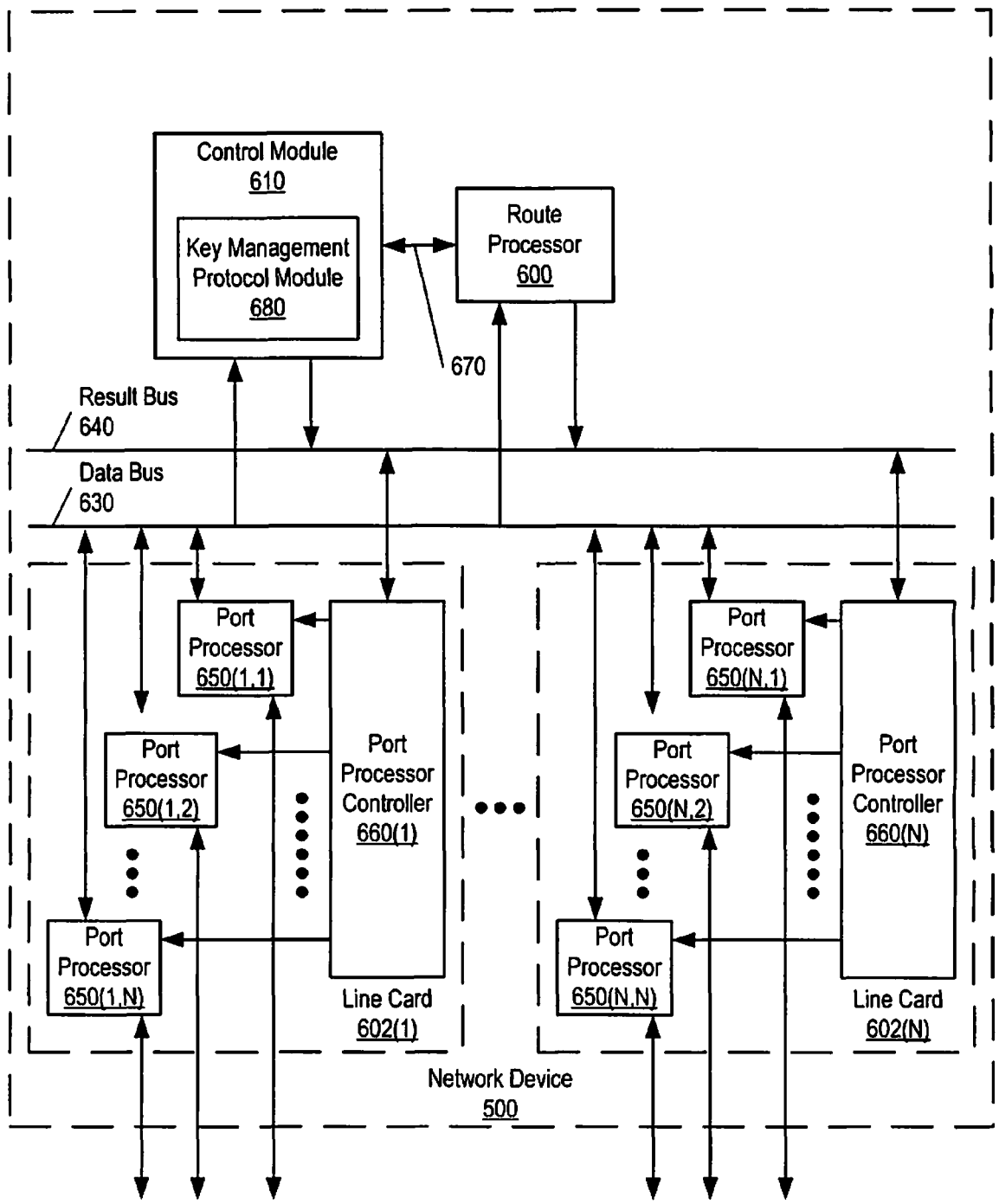
FIG. 5 is a block diagram of a network device, according to one embodiment of the present invention.

FIG. 5 is a block diagram illustrating a network device 500 (e.g., one of key servers 10(1)-10(2), discovery server 12, and/or one of network devices 14(1)-14(5) of FIG. 1). In this depiction, network device 500 includes a number of line cards (line cards 602(1)-602(N)) that are communicatively coupled to a control module 610 (which can include a forwarding engine, not shown) and a route processor 600 via a data bus 630 and a result bus 640. Line cards 602(1)-(N) include a number of port processors 650(1,1)-650(N,N) which are controlled by port processor controllers 660(1)-660(N). It will also be noted that control module 610 and route processor 600 are not only coupled to one another via data bus 630 and result bus 640, but are also communicatively coupled to one another by a communications link 670. It is noted that in alternative embodiments, each line card can include its own forwarding engine.

When a packet such as a discovery message is received, the discovery message is identified and analyzed by a network device such as network device 500 in the following manner, according to embodiments of the present invention. Upon receipt, a discovery message (or some or all of its control information) is sent from one of the port processors 650(1,1)-650(N,N) at which the discovery message was received to one or more of those devices coupled to data bus 630 (e.g., others of port processors 650(1,1)-650(N,N), a forwarding engine, and/or route processor 600). Handling of the discovery message can be determined, for example, by a forwarding engine. For example, a forwarding engine may determine that the discovery message should be forwarded to one or more of port processors 650(1,1)-650(N,N). This can be accomplished by indicating to corresponding one(s) of port processor controllers 660(1)-660(N) that the copy of the discovery message held in the given one(s) of port processors 650(1,1)-650(N,N) should be forwarded to the appropriate one of port processors 650(1,1)-650(N,N).

Network device 500 can implement one or more key management protocol modules 680 in order to act as a key server, discovery server, and/or group member (e.g., in control module 610, as shown, or in one of port processor controllers 660(1)-660(N) nd/or in route processor 600). Key management protocol module 680 can thus implement one or both of the methods illustrated in FIGS. 3 and 4.

If network device 500 is a group member, when a packet is received and identified as a discovery message, key management protocol module 680 can authenticate and authorize that discovery message, determine whether to process that discovery message, extract an appropriate key server list from that message, and store that key server list for later use. Key management protocol module 680 can also control how network device 500 registers with a key server.

If network device 500 is a discovery server, key management protocol module 680 can provide a user interface to allow a user to provide information usable to generate one or more key server lists. Key management protocol module 680 can also generate and send discovery messages to group members using one of the techniques described above.

Figure 6:
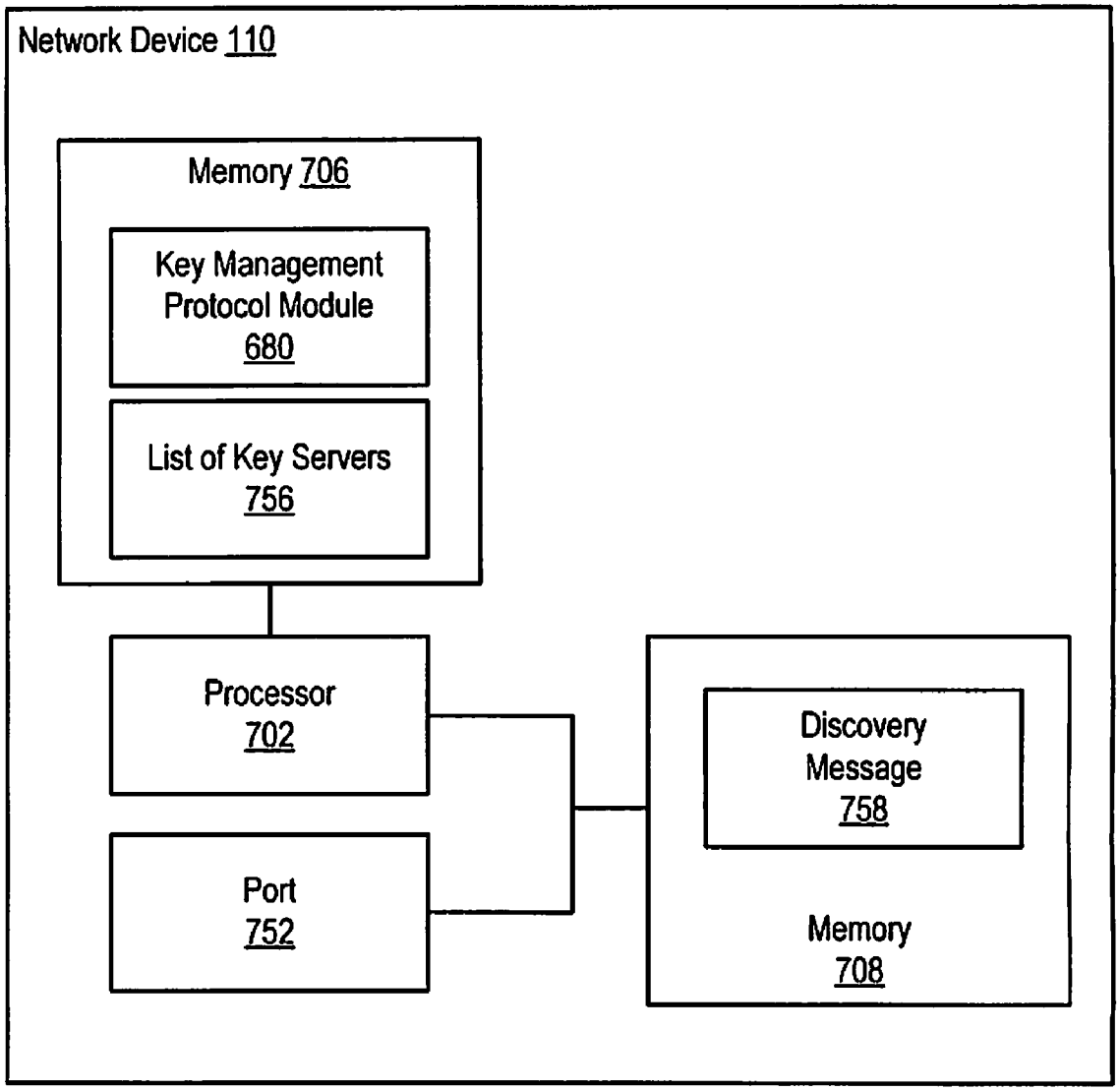
FIG. 6 is another block diagram of a network device, according to one embodiment of the present invention.

FIG. 6 is another block diagram of a network device (e.g., network device 500 of FIG. 5 and/or one of key servers 10(1)-10(2), discovery server 12, and/or one of network devices 14(1)-14(5) of FIG. 1), showing how key management protocol module 680 can be implemented in software. As illustrated, network device 110 includes one or more processors 702 (e.g., microprocessors, PLDs (Programmable Logic Devices), or ASICs (Application Specific Integrated Circuits)) configured to execute program instructions stored in memories 706 and/or 708. Memories 706 and 708 can include various types of RAM (Random Access Memory), ROM (Read Only Memory), Flash memory, MEMS (Micro Electro-Mechanical Systems) memory, and the like. Network device 110 also includes one or more ports 752 (e.g., one or more hardware ports or other network interfaces that can be linked to other network devices, hosts, servers, storage devices, or the like). Processor 702, port 752, and memories 706 and 708 are coupled to send and receive data and control signals by one or more buses or other interconnects.

In this example, program instructions executable to implement key management protocol module 680 are stored in memory 706. A copy of all or part of one or more lists of key servers 756 can also be stored in memory 706. A discovery message 758 that is about to be sent (if network device 110 is implementing a discovery server) or that has been received (if network device 110 is implementing a group member) can be stored in memory 708 for authentication, authorization, and processing by key management protocol module 680.

It is noted that the program instructions and/or data executable to implement key management protocol module 680 can be stored on various computer readable media such as a memory (e.g., RAM (Random Access Memory)). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described with respect to specific embodiments thereof, various changes and modifications may be suggested to one skilled in the art. It is intended such changes and modifications fall within the scope of the appended claims.

What is claimed is:

1. A method comprising:
   generating, performed by a discovery server, a message, wherein the discovery server is configured to distribute information identifying one or more key servers, wherein the discovery server is not one of the one or more key servers, wherein the one or more key servers are configured to distribute cryptographic policy or encryption keys, wherein the message comprises the information identifying the one or more key servers, wherein the message indicates a priority of each of the one or more key servers, and wherein a destination address of the message is a multicast address identifying a multicast group; and
   sending, performed by the discovery server, the message, via a network, to the multicast group without first receiving a request from one of a plurality of key management protocol group members, wherein the multicast group comprises the plurality of key management protocol group members.

2. The method of claim 1, further comprising:
   detecting a change in membership in a group of key servers; and
   performing the generating and the sending in response to the detecting, wherein subsequent to the change in membership, the group of key servers comprises the one or more key servers identified in the message.

3. The method of claim 1, further comprising:
   generating a digital signature, wherein
      the message comprises the digital signature.

4. The method of claim 1, wherein the generating the message comprises:
   generating a plurality of sets of information, wherein
      the message comprises the plurality of sets of information,
         each of the plurality of sets of information identifies a respective subset of the plurality of key servers, and
         each of a plurality of subsets of the plurality of key servers corresponds to a respective subset of the key management protocol group members.

5. The method of claim 3, wherein the digital signature comprises a digital certificate signed by a certificate authority.

6. The method of claim 1, further comprising:
   generating a second message, wherein the second message comprises information identifying a second plurality of key servers, wherein the information in the second message is different than the information in the message, and wherein a group of key servers comprises the plurality of key servers identified in the message and the second plurality of key servers identified in the second message; and
   sending the second message to a second plurality of key management protocol group members.

7. The method of claim 6, wherein the information in the second message assigns different priorities to key servers than the information in the message.

8. The method of claim 6, wherein the information in the second message identifies different key servers than the information in the message.

9. The method of claim 6, wherein the message is sent to a first multicast destination address and the second message is sent to a second multicast destination address.

10. A method comprising:
    receiving a message, via a network, from a discovery server, wherein the discovery server is configured to distribute information identifying one or more key servers, wherein the discovery server is not one of the one or more key servers, wherein the one or more key servers are configured to distribute cryptographic policy or encryption keys, wherein the message comprises the information identifying the one or more key servers, wherein the message indicates a priority of each of the one or more key servers, wherein a destination address of the message is a multicast address identifying a multicast group comprising a plurality of key management protocol group members, and wherein the discovery server sends the discovery message to the multicast group without first receiving a request from one of the key management protocol group members; and
    using the information in the message to select one of the one or more key servers; and
    attempting to register with the selected one of the one or more key servers.

11. The method of claim 10, wherein the message comprises a plurality of lists of key servers, and wherein the method further comprises selecting one of the plurality of lists of key servers based upon a subgroup identifier.

12. A network device comprising:
    a key management protocol module of a discovery server, wherein the key management protocol module is configured to generate a discovery message, wherein the discovery server is configured to distribute information identifying one or more key servers, wherein the discovery server is not one of the one or more key servers, wherein the one or more key servers are configured to distribute cryptographic policy or encryption keys, wherein the discovery message comprises the information identifying the one or more key servers, wherein the discovery message indicates a priority of each of the one or more key servers, and wherein a destination address of the message is a multicast address identifying a multicast group; and
    a hardware interface configured to couple to a network, wherein the key management protocol module is configured to send, via the interface, the discovery message to the multicast group without first receiving a request from one of a plurality of key management protocol group members, wherein the multicast group comprises the plurality of key management protocol group members.

13. The network device of claim 12, wherein the key management protocol module is configured to generate and send the discovery message in response to detection of a change in membership in a group of key servers.

14. The network device of claim 12, wherein the discovery message comprises a plurality of sets of information, wherein each of the plurality of sets of information identifies a respective subset of a plurality of key servers, and wherein each of a plurality of subsets of the plurality of key servers corresponds to a respective subset of the key management protocol group members.

15. The network device of claim 12, wherein the key management protocol module is configured to generate a different discovery message, wherein the different discovery message identifies a different one or more key servers, and wherein the different discovery message is sent to a different destination address than the discovery message.

16. A network device comprising:
a hardware interface configured to receive a message from a discovery server, wherein the discovery server is configured to distribute information identifying one or more key servers, wherein the discovery server is not one of the one or more key servers, wherein the one or more key servers are configured to distribute cryptographic policy or encryption keys, wherein the message comprises the information identifying the one or more key servers, wherein the message indicates a priority of each of the one or more key servers, wherein a destination address of the message is a multicast address identifying a multicast group comprising a plurality of key management protocol group members, and wherein the discovery server sends the discovery message to the multicast group without first receiving a request from one of the key management protocol group members; and
a key management protocol module, wherein the key management protocol module is configured to extract the information in the message, use the extracted information to select one of the more key servers, and attempt to register with the selected one of the one or more key servers.

17. The network device of claim 16, wherein the message comprises a plurality of lists of key servers, and wherein the key management protocol module is further configured to select one of the plurality of lists of key servers based upon a subgroup identifier.

18. A system comprising:
means for generating a message in a discovery server, wherein the discovery server is configured to distribute information identifying one or more key servers, wherein the discovery server is not one of the one or more key servers, wherein the one or more key servers are configured to distribute cryptographic policy or encryption keys, wherein the message comprises the information identifying the one or more key servers, wherein the message indicates a priority of each of the one or more key servers, and wherein a destination address of the message is a multicast address identifying a multicast group; and
means for sending the message from the discovery server, via a network, to the multicast group without first receiving a request from one of a plurality of key management protocol group members, wherein the multicast group comprises the plurality of key management protocol group members.

19. A system comprising:
means for receiving a message from a discovery server, wherein the discovery server is configured to distribute information identifying one or more key servers, wherein the discovery server is not one of the one or more key servers, wherein the one or more key servers are configured to distribute cryptographic policy or encryption keys, wherein the message comprises the information identifying the one or more key servers, wherein the message indicates a priority of each of the one or more key servers, wherein a destination address of the message is a multicast address identifying a multicast group comprising a plurality of key management protocol group members, and wherein the discovery server sends the discovery message to the multicast group without first receiving a request from one of the key management protocol group members;
means for using the information in the message to select one of the more key servers; and
means for attempting to register with the selected one of the one or more key servers.

* * * * *